United States Patent
Howald et al.

(10) Patent No.: US 12,294,577 B2
(45) Date of Patent: May 6, 2025

(54) MULTIFACTOR AUTHENTICATION OF SECURE TRANSMISSION OF DATA

(71) Applicant: Walrus Security, Inc., New York, NY (US)

(72) Inventors: Max Ira Howald, New York, NY (US); Michael Walfish, New York, NY (US); Andrew Justin Blumberg, New York, NY (US); Benjamin Braun, Menlo Park, CA (US)

(73) Assignee: WALRUS SECURITY, INC., New York, NY (US)

( * ) Notice: Subject to any disclaimer, the term of this patent is extended or adjusted under 35 U.S.C. 154(b) by 333 days.

(21) Appl. No.: 17/935,381

(22) Filed: Sep. 26, 2022

(65) Prior Publication Data
US 2023/0099619 A1 Mar. 30, 2023

Related U.S. Application Data

(60) Provisional application No. 63/261,708, filed on Sep. 27, 2021.

(51) Int. Cl.
*H04L 9/40* (2022.01)

(52) U.S. Cl.
CPC ............ *H04L 63/0869* (2013.01); *H04L 9/40* (2022.05)

(58) Field of Classification Search
CPC .................................................. H04L 63/0869
See application file for complete search history.

(56) References Cited

U.S. PATENT DOCUMENTS

| | | | |
|---|---|---|---|
| 5,475,756 A | 12/1995 | Merritt | |
| 8,832,788 B1* | 9/2014 | Gibson | G06F 21/40 |
| | | | 726/28 |
| 10,832,244 B1* | 11/2020 | Chowdhury | G06Q 20/382 |
| 10,853,816 B1* | 12/2020 | Gaeta | G06Q 20/40145 |
| 11,410,175 B2 | 8/2022 | Howald et al. | |
| 2002/0112027 A1* | 8/2002 | McHugh | H04L 9/40 |
| | | | 709/219 |
| 2003/0074321 A1* | 4/2003 | Peled | G06Q 20/02 |
| | | | 705/51 |

(Continued)

FOREIGN PATENT DOCUMENTS

KR 20160113383 9/2016

*Primary Examiner* — Hieu T Hoang
(74) *Attorney, Agent, or Firm* — Slayden Grubert Beard PLLC

(57) ABSTRACT

Multifactor authentication of secure transmission of data, including, receiving, from a first computing device associated with a first user, identifying information associated with a second user; transmitting, based on the identifying information, a request for data; receiving the data from a second computing device associated with the second user; dynamically generating a textual statement, at least a portion of the textual statement based on at least a first portion of the data; receiving, via a first communication channel, a first communication that includes a media recording reciting the dynamically generated textual statement; receiving, via a second communication channel, a second communication indicating a second portion of the data; verifying, based on the first communication and the second communication, an authenticity of the second user; and transmitting the data to the first computing device in response to the verification.

10 Claims, 6 Drawing Sheets

(56) References Cited

U.S. PATENT DOCUMENTS

| | | | |
|---|---|---|---|
| 2004/0117493 A1* | 6/2004 | Bazot | H04L 63/0884 709/229 |
| 2004/0117500 A1* | 6/2004 | Lindholm | H04L 63/0807 709/231 |
| 2009/0094163 A1 | 4/2009 | Shastry | |
| 2009/0138405 A1* | 5/2009 | Blessing | H04L 63/1466 705/67 |
| 2010/0124902 A1* | 5/2010 | Hoh | H04L 63/105 455/411 |
| 2010/0131973 A1* | 5/2010 | Dillon | H04N 21/64322 725/120 |
| 2012/0036071 A1* | 2/2012 | Fulton | G06Q 20/4016 705/44 |
| 2013/0145425 A1* | 6/2013 | Shen | H04L 63/10 726/3 |
| 2013/0291124 A1* | 10/2013 | Zhao | H04L 67/02 726/28 |
| 2013/0311621 A1* | 11/2013 | Tyson | H04L 51/046 709/219 |
| 2015/0363581 A1* | 12/2015 | Ranadive | G06F 21/34 726/19 |
| 2017/0124562 A1* | 5/2017 | Hessler | G06Q 20/386 |
| 2017/0140380 A1 | 5/2017 | Tan et al. | |
| 2017/0201518 A1 | 7/2017 | Holmqvist et al. | |
| 2018/0096354 A1* | 4/2018 | Kohli | G06F 21/32 |
| 2019/0080331 A1* | 3/2019 | Howald | H04L 9/006 |
| 2020/0167494 A1* | 5/2020 | Ozer | G06F 16/176 |
| 2020/0403992 A1* | 12/2020 | Huffman | H04W 12/67 |
| 2021/0049560 A1* | 2/2021 | Kulpati | G06F 16/2379 |
| 2022/0122053 A1* | 4/2022 | Miller | G06Q 20/3221 |
| 2022/0294792 A1* | 9/2022 | Patel | H04L 63/0861 |

\* cited by examiner

MULTIFACTOR AUTHENTICATION OF SECURE TRANSMISSION OF DATA

CROSS-REFERENCE TO RELATED APPLICATIONS

The application claims priority to U.S. Provisional Patent Application No. 63/261,708 filed on Sep. 27, 2021, the disclosure of which is expressly incorporated herein by reference in its entirety.

BACKGROUND

Field of the Disclosure

The disclosure relates generally secure transmission of data between computing devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of receiving, from a first computing device associated with a first user, identifying information associated with a second user; transmitting, based on the identifying information, a request for data; receiving the data from a second computing device associated with the second user; dynamically generating a textual statement, at least a portion of the textual statement based on at least a first portion of the data; receiving, via a first communication channel, a first communication that includes a media recording reciting the dynamically generated textual statement; receiving, via a second communication channel, a second communication indicating a second portion of the data; verifying, based on the first communication and the second communication, an authenticity of the second user; and transmitting the data to the first computing device in response to the verification.

Other embodiments of these aspects include corresponding systems, apparatus, and computer programs, configured to perform the actions of the methods, encoded on computer storage devices.

These and other embodiments may each optionally include one or more of the following features. For instance, the first portion of the data differs from the second portion of the data. Providing, via the second communication channel, a message including a link; and receiving, via the second communication channel, the second communication via the link. Verifying the authenticity of the second user further includes determining that the first portion of the data of the second communication corresponds to the received data. Verifying the authenticity of the second user further includes performing speech recognition of the media recording to verify that audio of the media recording includes recitation of the dynamically generated textual statement. Verifying the authenticity of the second user further includes: comparing image data of the media recording with verified image data of the second user; and face matching the second user to the image data of the media recording based on the comparing. In response to verifying the authenticity of the second user, providing a communication to the first computing device including a notification that the second user is verified.

Innovative aspects of the subject matter described in this specification may be embodied in a method of receiving, from a first computing device associated with a first user, data and identifying information associated with a second user; dynamically generating a textual statement; receiving, via a first communication channel, a first communication that includes a media recording reciting the dynamically generated textual statement; receiving, via a second communication channel, a second communication indicating a snippet derived from the dynamically generated textual statement; verifying, based on the first communication and the second communication, an authenticity of the second user; and transmitting, in response to the verification, the data to a second computing device associated with the second user.

Other embodiments of these aspects include corresponding systems, apparatus, and computer programs, configured to perform the actions of the methods, encoded on computer storage devices.

These and other embodiments may each optionally include one or more of the following features. For instance, providing, via the second communication channel, a message including a link; and receiving, via the second communication channel, the second communication via the link. Verifying the authenticity of the second user further includes determining that the snippet of the dynamically generated textual statement of the second communication corresponds to the dynamically generated textual statement. Verifying the authenticity of the second user further includes performing speech recognition of the media recording to verify that audio of the media recording includes recitation of the dynamically generated textual statement. Verifying the authenticity of the second user further includes: comparing image data of the media recording with verified image data of the second user; and face matching the second user to the image data of the media recording based on the comparing. In response to verifying the authenticity of the second user, providing a communication to the first computing device including a notification that the second user is verified.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a smartphone, a tablet, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
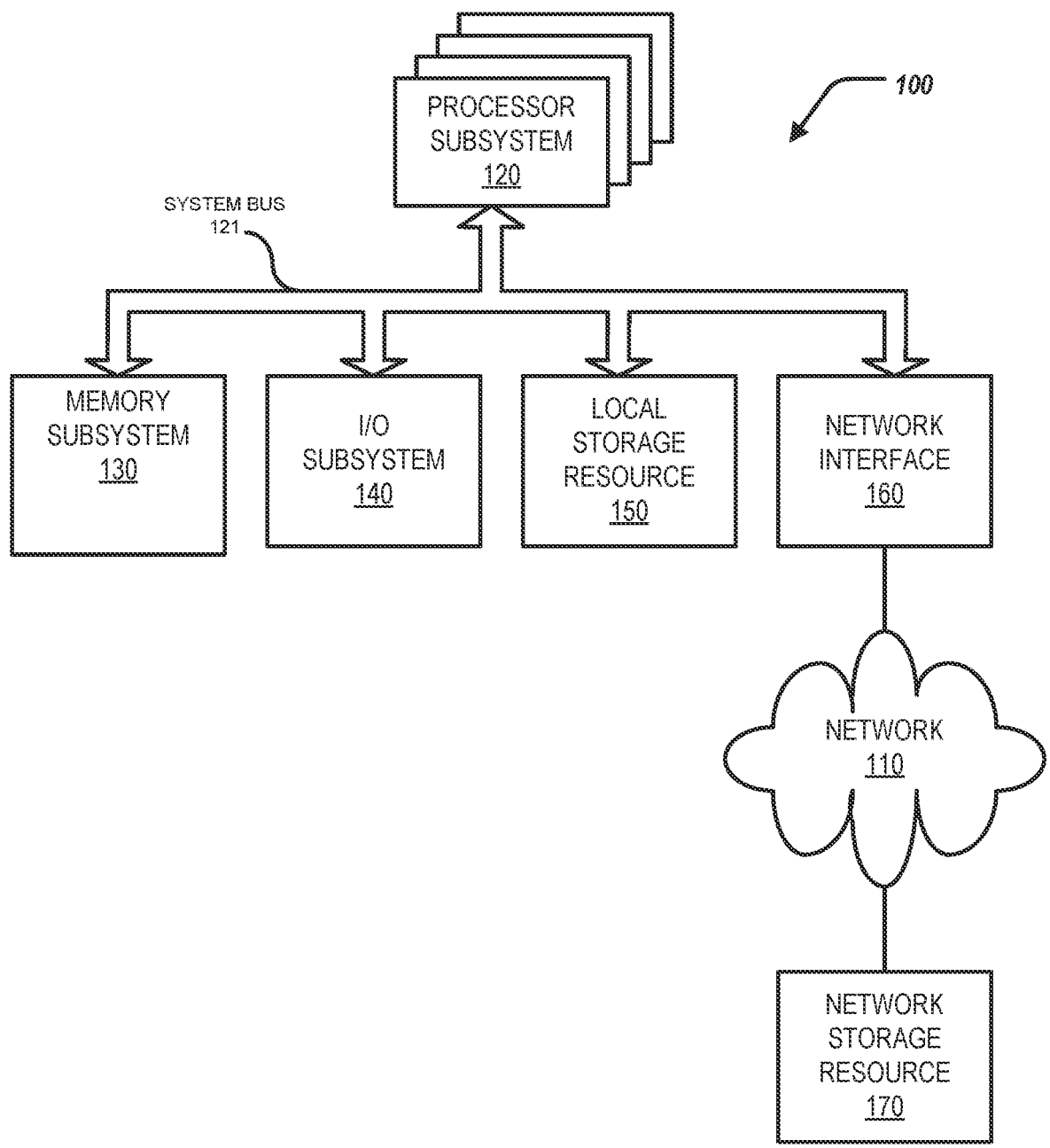
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
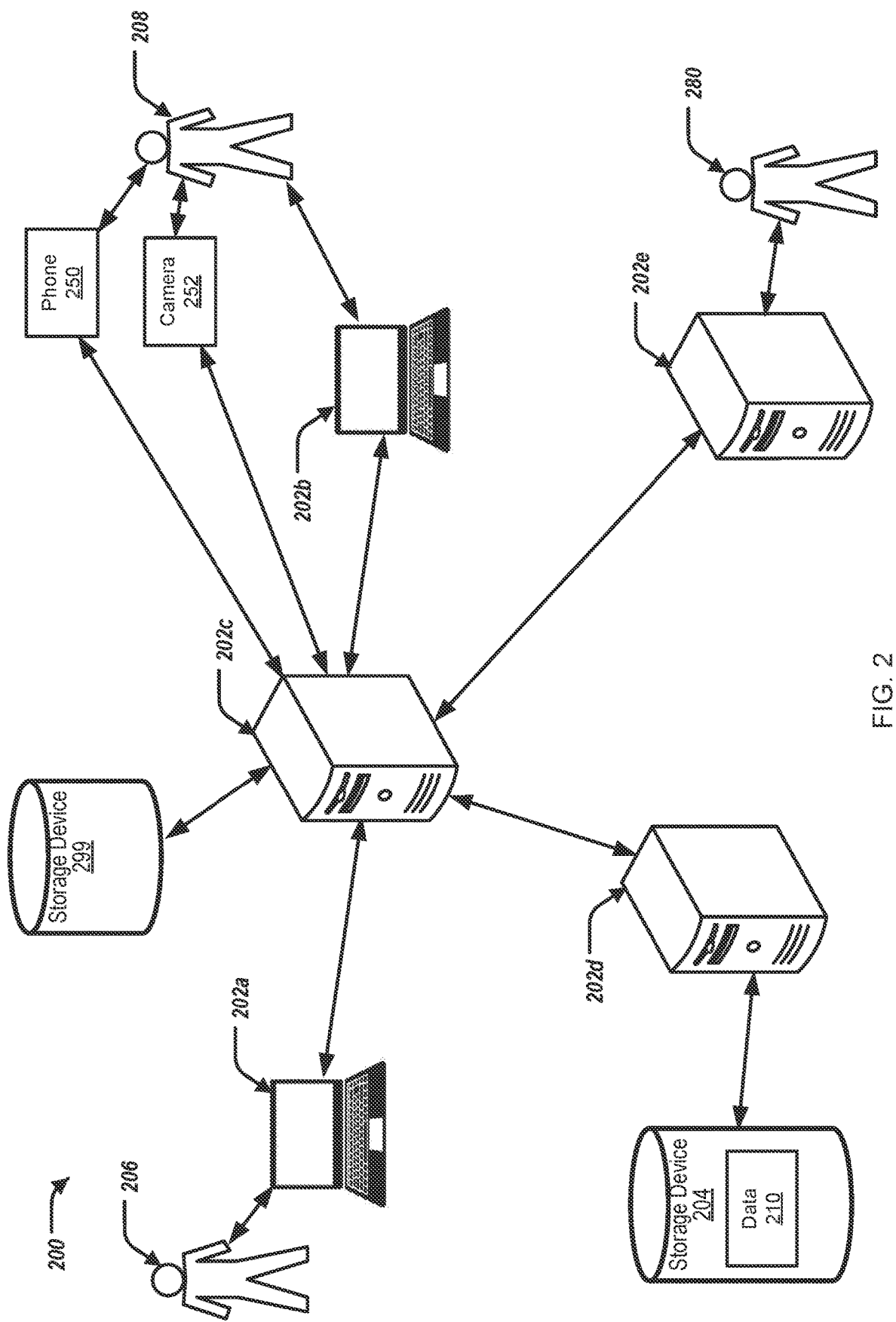
FIGS. 2, 3 and 5 illustrate respective block diagrams of computing environments for secure transmission of data between computing devices.

Turning to FIG. 2, FIG. 2 illustrates a computing environment 200. The computing environment 200 can include a first computing device 202a, a second computing device 202b, a central server computing device 202c, a backend server computing device 202d, an administrative server computing device 202e, and a storage device 299. In some examples, any of the first computing device 202a, the second computing device 202b, the central server computing device 202c, the backend server computing device 202d, and/or the administrative server computing device 202e is similar to, or includes, the information handling system 100 of FIG. 1. The environment 200 can further include a storage device 204. The storage device 204 can store data (or metadata) 210, as described further herein.

The central server computing device 202c can be in communication with the first computing device 202a, the second computing device 202b, the backend server computing device 202d, and the administrative server computing device 202e over one or more networks (e.g., the Internet). The central server computing device 202c can further be in communication with the storage device 299. The backend server computing device 202d can be in communication with the storage device 204.

The first computing device 202a and/or the second computing device 202b can be associated with a specific business such as, but not limited to, a corporation, a partnership, or another vehicle for business activity, and be associated with identifying characteristics such as, but not limited to, address, phone number, employee list, tax identification number, etc.

The first computing device 202a can be associated with a first user 206. The second computing device 202b can be associated with a second user 208. The first user 206 and/or the second user 208 can be associated with respective identifying characteristics such as, but not limited to, name, address, phone number, employer, business, photo, etc.

In some examples, the second computing device 202b can be associated with multiple second users. In some examples, the second computing device 202b can be considered a plurality of computing devices, each associated with one or more of the multiple second users.

The environment 200 can further include additional devices, such as a phone (or tablet) computing device 250, and a camera 252. The phone computing device 250 (or phone 250) and/or the camera 252 can be associated with the second user 208, and in communication with (or coupled with) the second computing device 202b. In some examples, the phone 250 and/or the camera 252 can be in communication with the central server computing device 202c over one or more networks (e.g., the Internet). In some examples, the phone 250 and/or the camera 252 can be in communication with the central server computing device 202c directly, or indirectly, through the second computing device 202b. In some examples, the second computing device 202b can include the phone 250, the camera 252, or both. In some examples, the phone 250 can include the camera 252.

In short, the environment 200, and specifically, the central server computing device 202c, can facilitate a method for the first computing device 202a, and in particular, the first user 206, to electronically receive data (or a signal) from the second computing device 202b, and in particular, the second user 208. Furthermore, the first computing device 202a, and in particular the first user 206, can receive assurances that the data was indeed sent by the second computing device 202b (verified) (and/or the associated second user 208), e.g., when the first user 206 is unaware or has no pre-existing knowledge of the second user 208. In some examples, the first computing device 202a, and in particular the first user 206, can receive assurances that the data was indeed sent by the second computing device 202b (verified) (and/or the associated second user 208), e.g., when the first computing device 202a is unaware or has no pre-existing knowledge of the second computing device 202b (outside of any communication protocols for communication).

Furthermore, the environment 200, and specifically the central server computing device 202c, can facilitate a method for the first computing device 202a, and in particular, the first user 206, to electronically transfer data (or a signal) to the second computing device 202b, and in particular, the second user 208. Furthermore, the first computing device 202a, and in particular the first user 206, can receive assurances that the data was indeed seen (received) by the second computing device 202b (verified) (and/or the associated second user 208), e.g., when the first user 206 is unaware or has no pre-existing knowledge of the second user 208. In some examples, the first computing device 202a, and in particular the first user 206, can receive assurances that the data was indeed seen (received) by the second computing device 202b (verified) (and/or the associated second user 208), e.g., when the first computing device 202a is unaware or has no pre-existing knowledge of the second computing device 202b (outside of any communication protocols for communication).

In some examples, the first computing device 202a and the second computing device 202b can communicate data therebetween utilizing a third-party computing device. Thus, the respective computing device (and/or associated user) can receive assurances that the data that was sent by the other computing device (verified) (and/or associated other user), e.g., when the respective computing device (and/or respective associated user) is unaware or has no pre-existing knowledge of the other computing device (and/or associated other user) or the third party computing device (and/or associated third party). For example, the third-party computing device can include the central server computing device 202c.

The environment 200, and in particular the central server computing device 202c, can facilitate a procedure for "multifactor action authentication," which uses an out-of-band communication channel for ensuring that an electronic action is valid. At a high level, the central server computing device 202c can store (or have access to) identifying characteristics/parameters of the second computing device 202b and/or the second user 208, such as, but not limited to, a name, an e-mail address, a phone number, a physical address, an employer, and/or a photo. The central server computing device 202c can receive a request from the first computing device 202a for data from the second computing device 202. The request can additionally include identifying information of the second computing device 202b and/or the second user 208. The central server computing device 202c can identify the second computing device 202b and/or the second user 208 from the provided identifying information, and provide a request to the second computing device 202b to provide such data that can be transmitted ultimately to the first computing device 202a. For example, the second user 208 can enter (in response to the request) data via the second computing device 202b through a web portal of a web link (via the first communication channel). For example, the data can include such information as a bank account number, wire transfer instructions, mailing address, stock transfer instructions, and cryptocurrency wallet addresses, or other text or images encoded electronically. The first communication channel, in some examples, can include the transmission path from the central server computing device 202c to the second computing device 202b (e.g., e-mail) and the reception path from the second computing device 202b to the central server computing device 202c (e.g., web link). In some examples, the central server computing device 202c can store, via the storage device 299, the data of the second computing device 202b and/or the second user 208 from previous interactions with the second computing device 202b and/or the second user 208. That is, prior to the request from the first computing device 202a for the data, the second user 208 has previously provided such data via the second computing device 202 through the web portal to the central server computing device 202c, with the central server computing device 202c storing such data at the storage device 299.

The server computing device 202c can generate an authentication challenge. Specifically, a first part of the authentication challenge can include instructions for the second user 208 to provide a video of the second user 208 reciting a dynamically generated textual statement. In some cases, the dynamically generated textual statement includes a first portion of the data (e.g., a portion of the data such as the last four digits of a bank account number). The central server computing device 202c can transmit the first part of the authentication challenge to the second user 208 via the first communication channel (e.g., at the web portal provided at the web link). The second user 208 can transmit, via the first communication channel, a first communication that includes media to the central server computing device 202c including recitation of the dynamically generated textual statement via the second computing device 202b and/or the camera 252.

The authentication challenge can further include a second part that includes a request for a textual response from the second user 208 indicating the data (or a portion of the data). The central server computing device 202c can transmit the second part of the authentication challenge to the second user 208 via a second communication channel. For example, the server computing device 202c can transmit the second part of the authentication challenge to the second user 202b over the second communication channel, such as a text message, a phone call, or a secure instant (or direct) message. For example, the text message can include a web link. The second user 208 can respond to the second part of the authentication challenge utilizing either the second computing device 202b and/or an additional device (such as the phone 250 and/or the camera 252), via the second communication channel, with a second communication indicating a second portion of the data (e.g., a portion of the data such as the first four digits of a bank account number). For example, the second user 208 can enable/select the web link of the text message that activates a web browser of the phone 250 for providing the second portion of the data. The second communication channel, in some examples, can include the transmission path from the central server computing device 202c to the phone 250 (e.g., text message) and the reception path from the second computing device 202b and/or phone 250 to the central server computing device 202c (e.g., web link). In some examples, the first portion of the data recited in the media of the first communication (in response to the first part of the authentication challenge) can differ from the second portion of the data provided via the additional device of the second communication (in response to the second part of the authentication challenge). In some examples, the first portion of the data recited in the media of the first communication (in response to the first part of the authentication challenge) can be the same as the second portion of the data provided via the additional device of the second communication (in response to the second part of the authentication challenge). In some examples, the second user 208 can respond utilizing an additional device that is separate from the second computing device 202b (e.g., when the phone 250 and/or the camera 252 are separate and distinct from the second computing device 202b). In some examples, the second user 208 can respond utilizing the second computing device 202b (e.g., when the phone 250 and/or the camera 252 are part of the second computing device 202b).

In some examples, the second computing device 202b can offload tasks related to authentication of the second user 208 and/or the second computing device 202b (i.e., the authentication tasks). For example, the second computing device 202b can transmit the requests for the data and the authentication challenge to a third computing device in communication with the second computing device 202b. The third computing device can respond to the requests for the data and the authentication challenge with the appropriate information.

The central server computing device 202c can verify if the first communication and the second communication provided by the second user 208 (over the first and the second communication channels) to the authentication challenge was successful (passed or not). When the authentication challenge is successful, the action can be executed—e.g., transmission of the data ultimately between the second computing device 202b and the first computing device 202a (from the second computing device 202b ultimately to the first computing device 202a or from the first computing device 202a ultimately to the second computing device 202b). In some examples, the transmission of the data between the first computing device 202a and the second computing device 202b is direct (between the first computing device 202a and the second computing device 202b); or indirect through the central server computing device 202c.

As a result of such verification of the second user 208, malicious compromise of any portion of the environment 200 can be prevented, as such a malicious actor would need to gain control of both (simultaneously) of the first communication channel and ii) the second communication channel. Further, malicious compromise can be prevented as such a malicious actor would need i) the first portion of the data provided in the media recording reciting the dynamically generated textual statement via the first communication channel and ii) the second portion of the data provided via the second communication channel.

In some examples, the server computing device 202c, when verifying if the response to the authentication challenge was successful, can autocorrect data provided by the second user 208 via the second computing device 202b based on a previous verification/validation of the second user 208 and/or the second computing device 202b. For example, when the data includes a known account number (e.g., a bank account number) and the second user 208 mis-provides the known account number, the central server computing device 202c can autocorrect the data to reflect the correct known account number. The central server computing device 202c can autocorrect the data to reflect the correct known account number based on previously verification/validation of the second user 208 and/or the second computing device 202b (e.g., previously provided the correct data). In some examples, the central server computing device 202c can provide a suggestion to the second user 208 via the second computing device 202b of the correct version of the data (e.g., the bank account number).

In some examples, to ensure the liveness and relevance of an authenticated communication of a collected media (e.g., audio and/or video) recording (e.g., utilizing the camera 252), the authentication challenge can include requiring (in the response) the party (e.g., the second user 208) to read/recite a statement (captured by the audio of the video recording) that is provided by the central server computing device 202c. The central server computing device 202c can dynamically generate, for example, a textual statement that the party (e.g., the second user 208) is to recite. In some examples, the dynamically generated textual statement can include a portion derived from the data (entered/provided by the second user 208), such as a cryptographic digest, a substring (e.g., last four digits of an account number), an arithmetic operation on a row or column of a spreadsheet, a date and time, an amount, or non-numerical details about an interactions (e.g., answers to knowledge-based authentication quiz question). In some examples, the portion can be separate and not derived from the data (independent from the data). For example, the second user 208 can be required (in response to the authentication challenge) to read/recite a sentence that includes the time and the date. The camera 252 can capture such response in a media (for example, video) recording, and provide such to the second computing device 202b for transmission to the central server computing device 202c; or the camera 252 can provide the video recording directly to the central server computing device 202c.

Moreover, the central server computing device 202c can verify the video recording (i.e., the video recording is authenticated, and represents the second user 208) by matching a face (or facial image) of a previously obtained photo (or image) of the second user 208 to that of the face provided within the video recording. The central server computing device 202c can obtain the photo (or image) of the second user 208 from the backend server computing device 202d. For example, the storage device 204 can include data 210, such as image data. In some examples, the image data can be manually input (e.g., from one or more administrators). In some examples, the image data can be provided by the first user 206 though the first computing device 202a (when image data/photos are available to the first computing device 202a/the first user 206 at the time the request is initiated). In some examples, the image data can be provided by the second user 208 through the second computing device 202b, phone 250, and/or camera 252. For example, the computing device 202b can collect image data such as, but not limited to, a driver's license of the second user 208, a passport of the second user 208, or other official identification of the second user 208. The second computing device 202b can use an automated tool or service for verifying the authenticity of the ID/image data of the second user 208. The second computing device 202b can provide such image data to the backend server computing device 202d through the central server computing device 202c. In some examples, the backend computing device 202d can "crawl" websites (e.g., social networking sites such as Facebook social networking service, or LinkedIn social networking service) over the Internet to identify/collect the photo, and store such at the storage device 204. The backend computing device 202d can utilize "crawling" programs to perform such traversal of the Internet.

The central server computing device 202c can perform verification of the video recording including techniques to ensure that the video recording is genuine and untampered with (e.g., malicious tampering). For example, the central server computing device 202c can implement machine learning speech recognition to transform the speech from the video recording provided by the second user 208 (for example, an audio portion of the video recording) into text and machine-learning lip-reading algorithms to transform the lip movements into phonemes. The central server computing device 202 can match the speech to the challenge phrase (the dynamically generated statement from the authentication challenge) and to the phonemes. The central server computing device 202c can utilize a machine learning algorithm for detection of deep fakes, trained on synthetic videos made using generation software. The central server computing device 202c can utilize machine learning techniques to detect artifacts (for example, metadata) left by video editing in order to verify the authenticity of the video recording. As a result, this may prevent a malicious actor (attacker) from producing in real-time fake (false) videos.

The central server computing device 202c can perform anomaly detection on the usage patterns of the second user 208. For example, the central server computing device 202c can perform anomaly detection on the usage patterns of the second user 208 by analyzing the data 210 (or metadata 210) that is associated with a series of web, phone, or other channels to determine if the interactions with the second user 208 and/or the second computing device 202b are consistent. Specifically, the central server computing device 202c can determine if the phone number associated with the second user 208 and/or the second computing device 202b and/or the phone 250 has recently been ported (e.g., transferred from one account to another), and check if caller ID look up (from various third-party databases) matches the name of the second user 208. The central server computing device 202c can check if the video recording of the second person 208 (obtained by the camera 252 and/or the second computing device 202b) matches known photos/images of the second user 208 and perform a video authenticity check, as described further herein. The central server computing device 202c can ensure/verify that a physical location (geolocation) of the phone 250 and/or the second computing device 202b are consistent with known (previously acquired) location information associated with the second user 208. The central server computing device 202c can ensure/verify that biometric details of the response patterns of the second user 208 match (correspond) to known (previously acquired) information of the second user 208. The biometric information can be collected previously or uploaded from a trusted source.

In some further implementations, the environment 200 and the central server computing device 202c can determine whether a purported communication came from a particular computing service. In the current example, the first computing device 202a is to obtain data from the second computing device 202b. Specifically, the first user 206 can request data from the second computing device 202b via a request provided at the first computing device 202a to the central server computing device 202c. The first user 206 can enter/provide, via the first computing device 202a, contact information and identifying data of the second user 208 and/or the second computing device 202b to the central server computing device 202c (e.g., via a website interface portal). In some examples, the contact information and identifying data of the second user 208 and/or the second computing device 202b was previously provided by the first user 206 via the first computing device 202a. In some examples, the contact information and identifying data of the second user 208 and/or the second computing device 202b is provisional contact information (based on prior experience of the first user 206 and/or first computing device 202a with the second user 208 and/or second computing device 202b). The server computing device 202c can collect the data from the second user 208 and/or the second computing device 202b and conduct an action authentication confirmation for the data, using verification that an accompanying video recording is live and relevant using metadata analysis for communication associated to the data, as described herein.

In some examples, the first user 206 at the first computing device 202a can request data from multiple second users of multiple second computing devices simultaneously. For example, the first user 206 via the first computing device 202a can upload a spreadsheet or tab-delimited file (or by API) specifying the identifying data for each of the second users. The server computing device 202c can re-iterate the authentication process and data retrieval process described herein for each of the second users of each respective second computing device.

In some examples, the first user 206 at the first computing device 202a can provide data to multiple second users of multiple second computing devices simultaneously. For example, the first user 206 via the first computing device 202b can upload a spreadsheet or tab-delimited file (or by API) specifying the identifying data of each of the second users at respective second computing devices. The server computing device 202c can re-iterate the authentication process and data transmittal process described herein for each of the second users of each respective second computing device.

In some examples, the central server computing device 202c can provide a web link to the second computing device 202b and/or the phone 250 for upload of the data. For example, the second user 206 can navigate a web browser of the second computing device 202b and/or the phone 250 to the web link for upload of the data. In some examples, the central server computing device 202c can e-mail the web link directed to the second user 206 for upload of the data. In some examples, the central server computing device 202c facilitates an automated telephone call to the second user 208 (e.g., via the phone 250) that verbalizes the web link to the second user 208.

In some examples, the central server computing device 202c can provide a web link and a code (e.g., a multi-digit number) to the second computing device 202b and/or the phone 250 for upload of the data. When the second user 206 navigates a web browser of the second computing device 202b and/or the phone 250 to the web link for upload of the data, the second user 206 additionally will provide the code (e.g., the multi-digit number) to facilitate upload and verification of the second user 208.

In some examples, the central server computing device 202c provides the web link to the first computing device 202a (for upload of the data from the second computing device 202b) that the first computing device 202a ultimately provides to the second computing device 202b and/or the phone 250 via a further communication channel. In some examples, the further communication channel is associated with both the first user 206 and the second user 208. For example, the further communication channel can include a messaging communication channel, such as text or SMS communication protocols.

In some examples, prior to the request for the data, the second user 208 uploads, via the second computing device 202b, the data to the storage device 299 associated with the central server computing device 202c. The central server computing device 202c, in response to the request for the data from the first computing device 202a, transmits/forwards the request to the second computing device 202b. In response, the second user 206 can provide input to the second computing device 202b indicating that such data is stored at the storage device 299 associated with the central server computing device 202c.

When the central server computing device 202c determines that all of the verification checks are passed, the central server computing device 202c can facilitate transfer of the data between the first computing device 202a and the second computing device 202b (e.g., provide (reveal) the data to the first computing device 202a or transfer the data to the second computing device 202b). The central server computing device 202c can store the outcome of such verification (with or without the transferred data) and present such outcome via an administrative interface to the first computing device 202a (e.g., in a list of transactions they participated in), the second computing device 202b (e.g., in a list of transactions they participated in), and/or administrators of the central server computing device 202c.

In some examples, when the central server computing device 202c determines that when all of the verification checks are passed, the central server computing device 202c can provide a notification (e.g., an email) to the first computing device 202a indicating such verification checks are passed, and the data is stored at the storage device 299. The first computing device 202a can access the storage device 299 to retrieve such data.

In some examples, during the verification process, the central server computing device 202c can compare the provisionally provided contact information by the first user 206 for the second user 208 with contact information obtained during the verification process of the second user 208. Results of such comparison can be provided for display on the first computing device 202a highlighting any discrepancies between the provisionally provided contact information and the contact information obtained during the verification process. For example, during the verification process, when a discrepancy exists between the provisionally provided contact information and the obtained contact information, the central server computing device 202c can infer that the contact information that is additionally associated with a third party (e.g., a banking infrastructure) is the correct contact information.

In some examples, one or more administrators 280 associated with the administrative server computing device 202e can perform a "manual" authentication confirmation of the second user 208 and/or the second computing device 202b. That is, the administrator 280 via the administrative server computing device 202e can determine whether the video recording is authentic, and represents the second user 208. The administrator 280 can indicate such via the administrative server computing device 202e, with the administrator server computing device 202e transmitting such indication (signal) to the central server computing device 202c.

Figure 3:
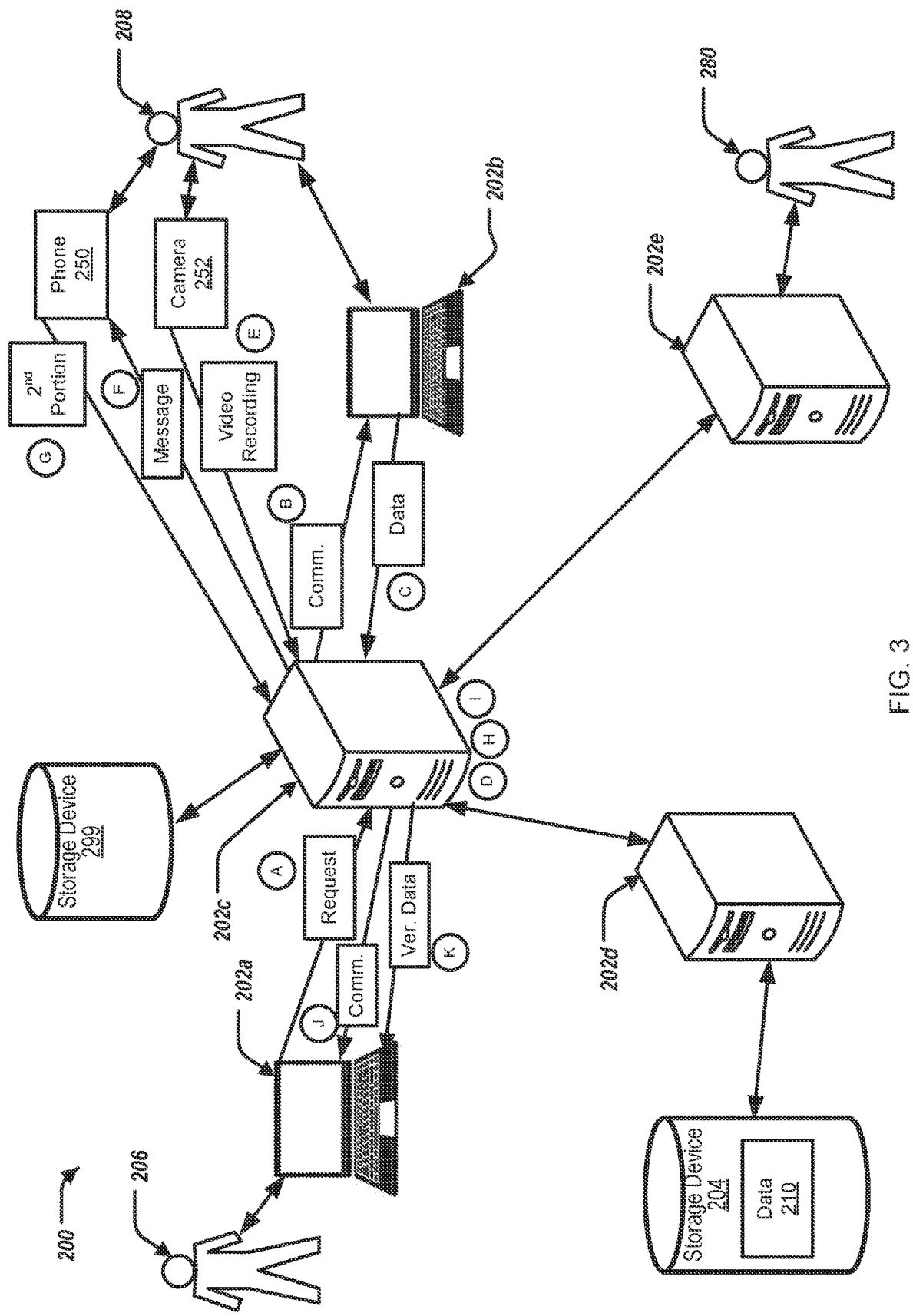

Referring to FIG. 3, in some further implementations, the first user 206 can request data from the second user 208 and enter/provide, via the first computing device 202a, contact information (e.g., name, phone number, email address, social networking link) that is associated with the second user 208 via a web interface portal of the central server computing device 202c, at A. In some examples, the contact information provided by the first user 206 can include provisional data (based on prior experience with the second user 208 by the first user 206).

The central server computing device 202c, in response to the request, can provide a communication (e.g., e-mail) to the second user 208 via a first communication channel, at B. For example, the central server computing device 202c can provide the communication to the second computing device 202b. The communication can include instructions for the second user 208, via the second computing device 202b, to upload the data (e.g., payment instructions) via a web link included in the communication.

The second user 208, via the second computing device 202b, can click/engage the web enabled link, and provide such data (e.g. payment instructions) via the first communication channel, at C. The web interface portal can collect the data (e.g., the payment instructions). In some examples, the central server computing device 202c can store the data at the storage device 299.

The central server computing device 202c can dynamically generate a textual statement, at D. In some examples, the dynamically generated textual statement can include a first portion derived from the data. The central server computing device 202b can provide the dynamically generated textual statement at the (previously provided) web link for access by the second user 208 and the second computing device 202b. In some examples, the central server computing device 202b can provide a further communication to the second user 208 and the second computing device 202b indicating the dynamically generated textual statement. In some examples, the dynamically generated textual statement can be associated with a time-limit for response by the second user 208.

The second user 208 can generate, a media (for example, audio and/or video) recording, via for example, the camera 252 and/or the second computing device 202b of the second user 208, that includes audio and/or video of the second user 208 reciting the dynamically generated textual statement. In some examples, the media recording of the second user 208 includes video and audio of the second user 208 reciting the dynamically generated textual statement that includes the first portion of the data. For example, the video recording can include the second user 208 reciting the dynamically generated textual statement and the last digit(s) of the account number associated with the second user 208 (the payment instructions). The camera 252 can transmit, via the first communication channel, a first communication including the media recording to the central server computing device 202c, at E. In some examples, when the camera 252 is included by the phone 250, the phone 250 transmits, via the first communication channel, the first communication including the media recording to the central server computing device 202c. In some examples, when the camera 252 is included by the second computing device 202b, the second computing device 202b transmits, via the first communication channel, the first communication including the media recording to the central server computing device 202c. For example, the media recording can be transmitted to the central server computing device 202c via the previously provided web enabled link using a web browser (of the phone 250 or the second computing device 202b). In some examples, the first communication is to be provided via the first communication channel within the time-limit indicated by the dynamically generated textual statement (or the verification of the authenticity of the second user 208 will fail).

The central server computing device 202c can provide a further communication (e.g., a phone-based message) to the second user 208 via a second communication channel, at F. For example, the central server computing device 202c can provide a message to the phone 250 (e.g., via SMS message or other messaging platform) that includes a further web based link. In some examples, the central server computing device 202c facilitates an automated telephone call to the second user 208 (e.g., via the phone 250) that verbalizes the web link to the second user 208. The further web based link can be the same web based link previously provided, or a new web based link. The further web based link, when clicked or engaged by the second user 208, provides a web interface portal via the phone 250 for the second user 208 to provide user input of a second portion of the data (e.g., the last digit(s) of their account number). The second user 208 provides a second communication, over the second communication channel, that includes user input of the second portion of the data, in response to the message, at G. In some examples, the first portion of the data provided at step E (within the media recording of the first communication) differs from the second portion of the data provided at step G (within the second communication). In some examples, the first portion of the data provided at step E (within the media recording of the first communication) is the same as the second portion of the data provided at step G (within the second communication).

The central server computing device 202c can verify whether the user input received at step G (within the second communication and via the second communication channel) matches/correlates with the received data, at H. That is, the central server computing device 202c compares the second portion of the data provided via the second communication by the second user 208 via the phone 250 (at step G) via the second communication channel with the data received from the second computing device 202b (at step C). Further, the central server computing device 202c can validate the media recording, at I. For example, the central server computing device 202c can validate the video recording (provided, for example, via the camera 252) using artificial intelligence (AI) based liveness and deep fake detectors (for example, including speech recognition to verify the phrase in the video recording) and comparing a photo/image data of the user using face matching to a photo/image data obtained from crawling the web (social networking photo or business-based photo). When the second portion of the data provided via the second communication by the second user 208 via the phone 250 (at step G) via the second communication channel matches or correlates with the data received from the second computing device 202b (at step C) and the media recording is validated, the central server computing device 202c has verified an authenticity of the second user 208 and/or the second computing device 202b.

The central server computing device 202c, when the authentication is successful and the validation information passes (for example, all of the verification checks are passed), provides the first computing device 202a with a communication (for example, an e-mail) indicating that an authenticity of the second user 208 and/or the second computing device 202b has been verified, at J. For example, the central server computing device 202c can verify that the user input received at step G matches/correlates with the data, and the media (for example, video) recording is valid.

Further, when all of the verification checks are passed, the central server computing device 202c can facilitate transfer of the data to the first computing device 202a, at K. For example, the data can include payment details associated with the second user 208 and/or the second computing device 202b. In some examples, as mentioned previously, the data is stored at the storage device 299. When the data is stored at the storage device 299, the central server computing device 202c provides access to the data stored by the storage device 299 (that is from the second computing device 202b). In some examples, the server computing device 202c can further provide information to the first computing device 202a displaying a visual comparison highlighting discrepancies of any provisional contact information provided by the first user 206 of the second user 208.

In some examples, the first computing device 202a and/or the first user 206, and the second computing device 202b and/or the second user 208 can have access credentials to an administrative record of this transaction via a web-based interface portal of the server computing device 202c. In some examples, any member of an organization (e.g., business/company) associated with the first computing device 202a and/or an organization (e.g., business/company) associated with the second computing device 202b can have access credentials to the administrative record of this transaction via web-based interface portal of the server computing device 202c.

Figure 4:
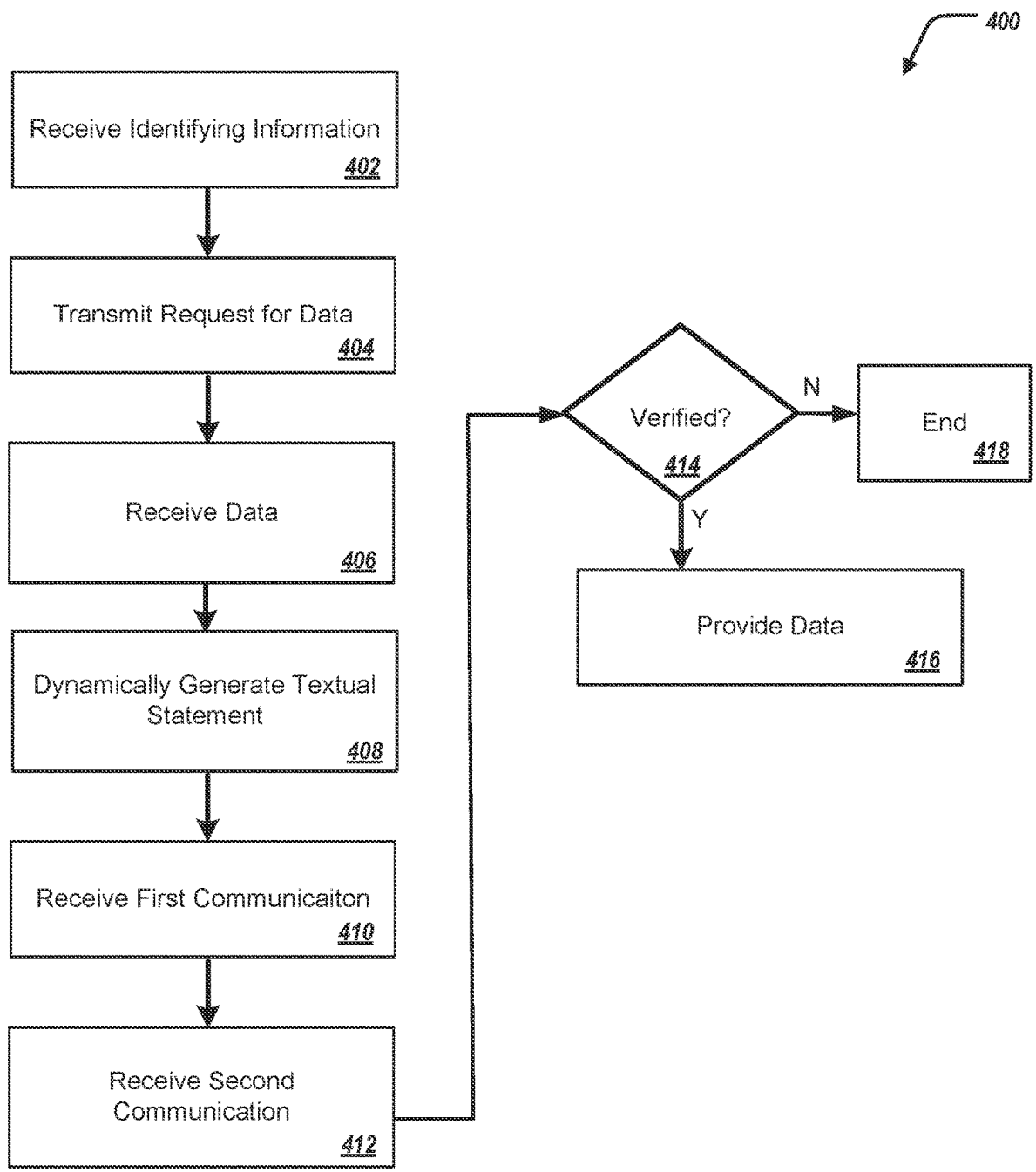
FIGS. 4 and 6 illustrate respective methods for secure transmission of data between computing devices.

FIG. 4 illustrates a flowchart depicting selected elements of an embodiment of a method 400 for secure transmission of data between computing devices. The method 400 may be performed by the computing environment 100 and/or computing environment 200, and with reference to FIGS. 1-3. It is noted that certain operations described in method 400 may, in some embodiments, be optional and/or may be rearranged in a different order.

The central server computing device 202c can receive, from the first computing device 202a, identifying information associated with the second user 208, at 402. The central server computing device 202c, based on the identifying information, transmits a request for data, at 404. The central server computing device 202c can receive the data from the second computing device 202b, at 406. The central server computing device 202c dynamically generates a textual statement, at 408. At least a portion of the dynamically generated textual statement is based on at least a first portion of the data. The central server computing device 202c receives, via a first communication channel, a first communication that includes a media (for example, video) recording reciting the dynamically generated textual statement, at 410. The central server computing device 202c receives, via a second communication channel, a second communication indicating a second portion of the data, at 412. The central server computing device 202c determines a verification, based on the first communication and the second communication, of an authenticity of the second user 208, at 414. The central server computing device 202, in response to verification of the authenticity of the second user 208, transmits the data to the first computing device, at 416. The central server computing device 202c, in response to not verifying the authenticity of the second user 208, ends the verification process, at 418.

Figure 5:
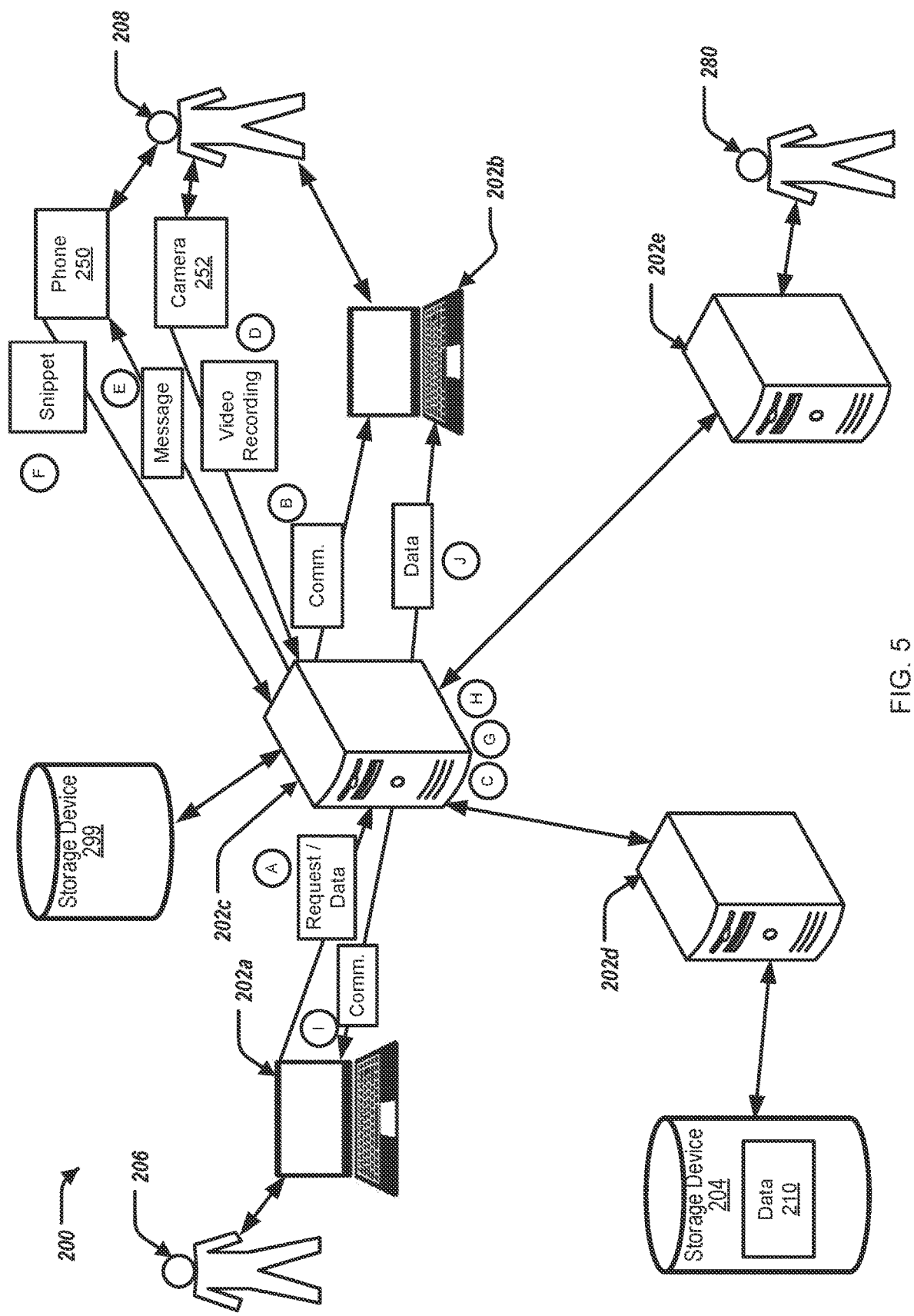

Referring to FIG. 5, in some further implementations, the first user 206 can transmit data to the second user 208 and enter/provide, via the first computing device 202a, contact information (e.g., name, phone number, email address, social networking link) that is associated with the second user 208 via a web interface portal of the server computing device 202c, at A. In some examples, the contact information provided by the first user 206 can include provisional data (for example, based on prior experience with the second user 208 by the first user 206).

In some examples, the first user 206 can provide the data (e.g., payment instructions) via a web interface portal of the central server computing device 202c. The web interface portal can collect the data. In some examples, the central server computing device 202c can store the data at the storage device 299.

The central server computing device 202c, in response to the request, can provide a communication (e.g., e-mail) to the second user 208 via a first communication channel, at B. For example, the central server computing device 202c can provide the communication to the second computing device 202b. The communication can include instructions for the second user 208, via the second computing device 202b, for verification via a web link.

The central server computing device 202c can dynamically generate a textual statement, at C. The central server computing device 202b can provide the dynamically generated textual statement at the web link for access by the second user 208 and the second computing device 202b. In some examples, the dynamically generated textual statement can be associated with a time-limit for response by the second user 208.

The second user 208 can generate a media (for example, audio and/or video) recording, via for example the camera 252 and/or the second computing device 202b of the second user 208, that includes video and audio of the second user 208 reciting the dynamically generated textual statement. The camera 252 can transmit, via the first communication channel, a first communication including the media recording to the central server computing device 202c, at D. In some examples, when the camera 252 is included by the phone 250, the phone 250 transmits, via the first communication channel, the first communication including the media recording to the central server computing device 202c. In some examples, when the camera 252 is included by the second computing device 202b, the second computing device 202b transmits, via the first communication channel, the first communication including the media recording to the central server computing device 202c. For example, the media recording can be transmitted to the central server computing device 202c via the previously provided web enabled link using a web browser (of the phone 250 or the second computing device 202b). In some examples, the first communication is to be provided via the first communication channel within the time-limit indicated by the dynamically generated textual statement (or the verification of the authenticity of the second user 208 will fail).

The central server computing device 202c can provide a further communication (e.g., a phone-based message) to the second user 208 via a second communication channel, at E. For example, the central server computing device 202c can provide a message to the phone 250 (e.g., via SMS message or other messaging platform) that includes a further web based link. In some examples, the central server computing device 202c facilitates an automated telephone call to the second user 208 (e.g., via the phone 250) that verbalizes the web link to the second user 208. The further web based link can be the same web based link previously provided, or a new web based link. The further web based link, when clicked or engaged by the second user 208, provides a web interface portal via the phone 250 for the second user 208 to provide user input of a snippet derived from the dynamically generated statement (e.g., a date and a time). The second user 208 provides a second communication, over the second communication channel, that includes user input of the snippet, in response to the message, at F.

The central server computing device 202c can verify whether the user input received at step F (within the second communication and via the second communication channel) matches/correlates with the dynamically generated textual statement, at G. That is, the central server computing device 202c compares the user input provided via the second communication by the second user 202b via the phone 250 (at step F) via the second communication channel with the dynamically generated textual statement. Further, the central server computing device 202c can validate the media (for example, video) recording, at H. For example, the central server computing device 202c can validate the media (for example, video) recording (provided, for example, via the camera 252) using artificial intelligence (AI) based liveness and deep fake detectors (for example, including speech recognition to verify the phrase in the video recording) and comparing a photo/image data of the user using face matching to a photo/image data obtained from crawling the web (social networking photo or business-based photo). When the snippet provided via the second communication by the second user 208 via the phone 250 via the second communication channel (at step F) matches or correlates with the dynamically generated textual statement and the media recording is validated, the central server computing device 202c has verified an authenticity of the second user 208 and/or the second computing device 202b.

The central server computing device 202c, when the authentication is successful and the validation information passes (all of the verification checks are passed), provides the first computing device 202a with a communication (e.g., e-mail) indicating that an authenticity of the second user 208 and/or the second computing device 202b has been verified, at I. For example, the central server computing device 202c can verify that the user input received at step F matches/correlates with the dynamically generated textual statement, and the video recording is valid.

Further, when all of the verification checks are passed, the central server computing device 202c can facilitate transfer of the data to the second computing device 202b, at J. For example, the data can include payment details associated with the first user 206 and/or the first computing device 202a. In some examples, as mentioned previously, the data is stored at the storage device 299. When the data is stored at the storage device 299, the central server computing device 202c provides access to the data stored by the storage device 299 (that is from the first computing device 202a). In some examples, the server computing device 202c can further provide information to the first computing device 202a displaying a visual comparison highlighting discrepancies between any provisional contact information provided by the first user 206 and the second user 208.

In some examples, the first computing device 202a and/or the first user 206, and the second computing device 202b and/or the second user 208 can have access credentials to an administrative record of this transaction via a web-based interface portal of the server computing device 202c. In some examples, any member of an organization (e.g., business/company) associated with the first computing device 202a and/or an organization (e.g., business/company) associated with the second computing device 202b can have access credentials to the administrative record of this transaction via web-based interface portal of the server computing device 202c.

Figure 6:
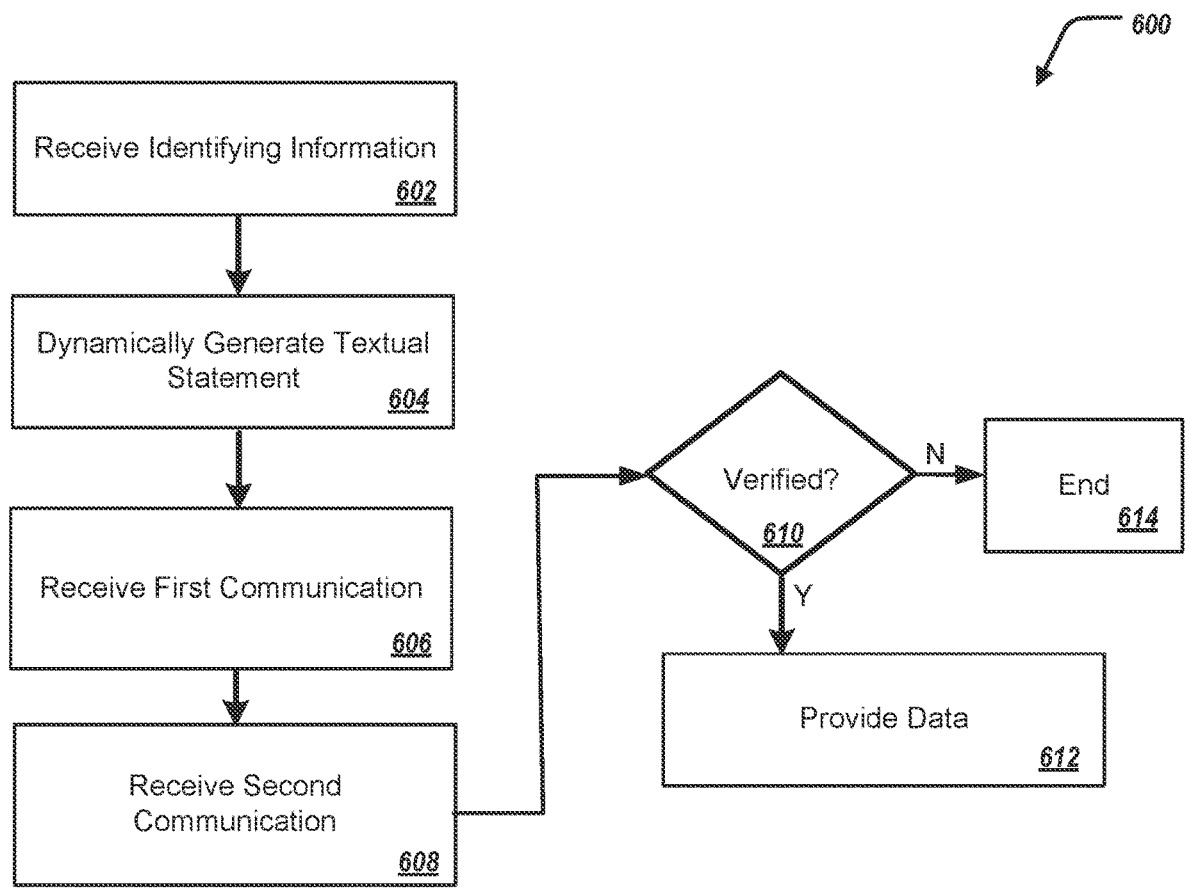

FIG. 6 illustrates a flowchart depicting selected elements of an embodiment of a method 600 for secure transmission of data between computing devices. The method 600 may be performed by the computing environment 100 and/or computing environment 200, and with reference to FIGS. 1, 2, and 5. It is noted that certain operations described in method 600 may, in some embodiments, be optional and/or may be rearranged in a different order.

The central server computing device 202c can receive, from the first computing device 202a, data and identifying information associated with the second user 208, at 602. The central server computing device 202c dynamically generates a textual statement, at 604. The central server computing device 202c receives, via a first communication channel, a first communication that includes a media (video) recording reciting the dynamically generated textual statement, at 606. The central server computing device 202*c* receives, via a second communication channel, a second communication indicating a snippet derived from the dynamically generated statement, at 608. The central server computing device 202*c* determines a verification, based on the first communication and the second communication, of an authenticity of the second user 208, at 610. The central server computing device 202, in response to verification of the authenticity of the second user 208, transmits the data to the second computing device 202*b*, at 612. The central server computing device 202, in response to not verifying the authenticity of the second user 208, ends the verification process, at 614.

In some further implementations, the first computing device 202*a* and/or the first user 206 can be authenticated/verified similar to that mentioned above with authentication/verification of the second computing device 202*b* and/or the second user 208. For example, in the process of the second computing device 202*b* and/or associated second user 208 receiving the data from the first computing device 202*a* (directly or indirectly) and/or associated first user 206, the first computing device 202*a* and/or the first user 206 can be authenticated/verified. As a result, the second computing device 202*b* can receive assurances that the data was indeed sent by the first computing device 202*a* and/or first user 206, similar to that mentioned above with authentication/verification of the second computing device 202*b* and/or the second user 208. As another example, in the process of the second computing device 202*b* and/or associated second user 208 sending data to the first computing device 202*a* (directly or indirectly) and/or associated first user 206, the first computing device 202*a* and/or the first user 206 can be authenticated/verified. As a result, the second computing device 202*b* can receive assurances that the data was indeed received and/or seen by the first computing device 202*a* and/or associated first user 206, similar to that mentioned above with authentication/verification of the second computing device 202*b* and/or the second user 208.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    receiving, from a first computing device associated with a first user, identifying information associated with a second user;
    transmitting, based on the identifying information, a request for data;
    receiving the data from a second computing device associated with the second user;
    dynamically generating a textual statement, at least a portion of the textual statement based on at least a first portion of the data;
    receiving, via a first communication channel, a first communication that includes a media recording reciting the dynamically generated textual statement;
    receiving, via a second communication channel, a second communication indicating a second portion of the data;
    verifying, based on the first communication and the second communication, an authenticity of the second user; and
    transmitting the data to the first computing device in response to the verification.

2. The computer-implemented method of claim 1, wherein the first portion of the data differs from the second portion of the data.

3. The computer-implemented method of claim 1, further comprising:
    providing, via the second communication channel, a message including a link; and
    receiving, via the second communication channel, the second communication via the link.

4. The computer-implemented method of claim 1, wherein verifying the authenticity of the second user further includes determining that the first portion of the data of the second communication corresponds to the received data.

5. The computer-implemented method of claim 1, wherein verifying the authenticity of the second user further includes performing speech recognition of the media recording to verify that audio of the media recording includes recitation of the dynamically generated textual statement.

6. The computer-implemented method of claim 1, wherein verifying the authenticity of the second user further includes:
    comparing image data of the media recording with verified image data of the second user; and
    face matching the second user to the image data of the media recording based on the comparing.

7. The computer-implemented method of claim 1, further comprising in response to verifying the authenticity of the second user, providing a communication to the first computing device including a notification that the second user is verified.

8. An information handling system comprising a processor having access to memory media storing instructions executable by the processor to perform operations, comprising:

receiving, from a first computing device associated with a first user, identifying information associated with a second user;

transmitting, based on the identifying information, a request for data; receiving the data from a second computing device associated with the second user;

dynamically generating a textual statement, at least a portion of the textual statement based on at least a first portion of the data;

receiving, via a first communication channel, a first communication that includes a media recording reciting the dynamically generated textual statement;

receiving, via a second communication channel, a second communication indicating a first snippet derived from the data;

verifying, based on the first communication and the second communication, an authenticity of the second user; and transmitting the data to the first computing device in response to the verification.

9. The information handling system of claim 8, wherein the first portion of the data differs from the second portion of the data.

10. The information handling system of claim 8, the operations further comprising:

providing, via the second communication channel, a message including a link; and receiving, via the second communication channel, the second communication via the link.

* * * * *